United States Patent
Joo et al.

(10) Patent No.: US 12,421,922 B2
(45) Date of Patent: Sep. 23, 2025

(54) WATER-COOLED FLUE GAS COLLECTING APPARATUS AND WAKE TREATMENT SYSTEM INCLUDING THE SAME

(71) Applicant: AGENCY FOR DEFENSE DEVELOPMENT, Daejeon (KR)

(72) Inventors: Seong-Pil Joo, Daejeon (KR); Seon-Uk Heo, Daejeon (KR); Ji-Su Yoon, Daejeon (KR); Jun-Young Heo, Daejeon (KR); Seok-Jin Oh, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 179 days.

(21) Appl. No.: 18/204,510

(22) Filed: Jun. 1, 2023

(65) Prior Publication Data
US 2023/0399998 A1 Dec. 14, 2023

(30) Foreign Application Priority Data
Jun. 10, 2022 (KR) .................. 10-2022-0070561

(51) Int. Cl.
*F02K 9/96* (2006.01)
*B64F 1/26* (2006.01)

(52) U.S. Cl.
CPC . *F02K 9/96* (2013.01); *B64F 1/26* (2013.01)

(58) Field of Classification Search
CPC ...................................................... F02K 9/96
See application file for complete search history.

(56) References Cited

U.S. PATENT DOCUMENTS

| | | | | |
|---|---|---|---|---|
| 2,940,537 A | * | 6/1960 | Smith | B64F 1/26 181/218 |
| 3,011,336 A | * | 12/1961 | Weiss | G01N 1/2202 55/529 |
| 3,152,479 A | | 10/1964 | Small et al. | |
| 3,205,705 A | * | 9/1965 | Talley | B64F 1/26 73/112.01 |
| 3,270,835 A | * | 9/1966 | Kramer | B64F 1/26 181/260 |

(Continued)

FOREIGN PATENT DOCUMENTS

| JP | 3985027 B2 | 10/2007 |
|---|---|---|
| JP | 2016-061263 A | 4/2016 |

(Continued)

*Primary Examiner* — Lorne E Meade
(74) *Attorney, Agent, or Firm* — LRK PATENT LAW FIRM

(57) ABSTRACT

The present invention provides a water-cooled flue gas collecting apparatus disposed in a flow path formed inside a wake treatment structure for cooling and discharging flue gas generated from a test propulsion system. The water-cooled flue gas collecting apparatus includes a gas guiding portion having a flue gas inlet at one end through which the flue gas enters, a gas pipe connected to the flue gas inlet at one end to pass through the other end of the gas guiding portion and form an extension at the other end, and a collecting portion connected to the other end of the gas pipe to collect the flue gas entering through the gas pipe from the flue gas inlet. According to the present invention, the apparatus may be used in rocket propulsion systems of various sizes and allows quantitative analyses.

4 Claims, 3 Drawing Sheets

(56) References Cited

U.S. PATENT DOCUMENTS

| | | | | |
|---|---|---|---|---|
| 3,684,054 | A | * | 8/1972 | Lemmerman ......... F01D 25/305 |
| | | | | 60/39.5 |
| 3,839,846 | A | * | 10/1974 | Teller ..................... B01D 50/00 |
| | | | | 95/212 |
| 3,899,923 | A | * | 8/1975 | Teller .................... F01N 13/082 |
| | | | | 60/39.5 |
| 3,938,390 | A | * | 2/1976 | Grey ..................... G01N 1/2258 |
| | | | | 73/863.11 |
| 4,662,216 | A | * | 5/1987 | Kessel ...................... F02K 9/96 |
| | | | | 73/112.01 |
| 4,733,751 | A | * | 3/1988 | Piesik ....................... F02K 9/96 |
| | | | | 181/217 |
| 7,793,506 | B2 | * | 9/2010 | Anderson ............. B08B 15/002 |
| | | | | 60/772 |

FOREIGN PATENT DOCUMENTS

| | | | | |
|---|---|---|---|---|
| KR | 10-2003-0054459 A | | 7/2003 | |
| KR | 20030054459 A | * | 7/2003 | ............... F02K 9/96 |
| KR | 10-1864480 B1 | | 7/2018 | |
| KR | 10-2150603 B1 | | 9/2020 | |

* cited by examiner

WATER-COOLED FLUE GAS COLLECTING APPARATUS AND WAKE TREATMENT SYSTEM INCLUDING THE SAME

CROSS REFERENCE TO RELATED APPLICATION

The present application claims priority to Korean Patent Application No. 10-2022-0070561, filed Jun. 10, 2022, the entire content of which is incorporated herein for all purposes by this reference.

BACKGROUND OF THE INVENTION

1. Field of the Invention

The present invention relates to a wake treatment system for treating high-temperature and high-pressure flue gas generated after combustion in the ground combustion test of solid and liquid rockets and a water-cooled flue gas collecting apparatus applied thereto.

2. Description of Related Art

The wake treatment system is an apparatus for treating, collecting, and analyzing the high-temperature and high-pressure flue gas generated after combustion in the ground combustion test of the solid and liquid rockets.

The wake treatment system has a structure for spraying water into the flow path of the flue gas to cool the high-temperature flue gas and storing water.

The flue gas is slowed down and discharged into the atmosphere, and at this time, the high-temperature flue gas is dissolved by the coolant, and the dissolved flue gas is collected and the combustion products are analyzed.

However, the wake treatment system is a large structure that is fixed in place and cannot be moved according to the size of the rocket. In addition, measuring the amount of gas dissolved is difficult, which is a disadvantage in performing quantitative analysis. Therefore, there is a need for the technology for a flue gas collecting apparatus that can be applied to rocket propulsion systems of various sizes and allows for quantitative analyses is required.

The matters described above in the technical background are intended only for a better understanding of the background of the present invention and may include matters other than the conventional technology already known to those with common knowledge in the field to which the present invention pertains.

SUMMARY OF THE INVENTION

The present invention is made to resolve the issues described above, and an object of the present invention is to provide a flue gas collecting apparatus and a wake treatment system including the apparatus that can be used for rocket propulsion systems of various sizes and allows for quantitative analyses.

According to an aspect of the present invention, a water-cooled flue gas collecting apparatus is disposed in a flow path formed inside a wake treatment structure for cooling and discharging the flue gas generated from a test propulsion system to collect the flue gas and includes a gas guiding portion having a flue gas inlet at one end through which the flue gas enters, a gas pipe connected to the flue gas inlet at one end to pass through the other end of the gas guiding portion at the other end and form an extension, and a collecting portion connected to the other end of the gas pipe to collect the flue gas entering through the gas pipe from the flue gas inlet.

Here, the gas guiding portion includes an inlet portion having the flue gas inlet at one end and a tubular body portion connected to the other end of the inlet portion to have an internal space, and the gas pipe passes through the other end of the tubular body portion to form an extension.

Further, the inlet portion has a wedge shape with a decreasing outer diameter towards the front.

A cooling tube portion that has a larger diameter than the gas pipe and is disposed outside the gas pipe such that the gas pipe passes through the rear end of the cooling tube portion while the front end is open may be further included.

On the other hand, a coolant inlet through which the coolant enters is formed on one side of the cooling tube portion, and a coolant outlet through which the coolant is discharged is formed on one side of the body portion.

Accordingly, the coolant entering through the coolant inlet flows along the outer surface of the gas pipe and the inner surface of the cooling tube portion to cool the flue gas inside the gas pipe and flows out the open front end to be discharged through the coolant outlet.

Next, according to an aspect of the present invention, a wake treatment system includes the water-cooled flue gas collecting apparatus, a wake treatment structure with the water-cooled flue gas collecting apparatus disposed in a flow path formed therein, and a storage tank provided below the wake treatment structure.

The flue gas generated from the test propulsion system enters the wake treatment structure through a flue gas inlet portion formed at one end of the wake treatment structure, follows the flow path, and is discharged through a flue gas outlet portion formed at the other end of the wake treatment structure.

On the other hand, the outer circumference of the vertical cross-section of the wake treatment structure is not constant.

A dummy space for changing the flow path of the flue gas may be formed inside the wake treatment structure.

Further, a plurality of coolant nozzles is provided on the inner wall surface of the wake treatment structure such that the coolant is sprayed into the wake treatment structure through the plurality of coolant nozzles.

A plurality of coolant outlets is formed at the lower end of the wake treatment structure such that the coolant inside the wake treatment structure is stored in the storage tank through the coolant outlets.

In particular, the water-cooled flue gas collecting apparatus is disposed in the flow path on the side of the flue gas inlet portion.

On the other hand, a drive device provided inside the wake treatment structure to move the water-cooled flue gas collecting apparatus forward or backward may be further included.

In addition, a detector provided inside the wake treatment structure to measure the length of the flame of the test propulsion system and a controller controlling the drive device according to the length of the flame of the test propulsion system measured by the detector may be further included.

DETAILED DESCRIPTION OF THE INVENTION

Reference is to be made to the accompanying drawings illustrating preferred embodiments of the present invention and the content described in the accompanying drawings in order to fully understand the present invention, The operational advantages of the present invention, and the objects achieved by the embodiments of the present invention.

Already known techniques or repetitive descriptions that may unnecessarily obscure the gist of the present invention will be cut short or omitted.

Figure 1:
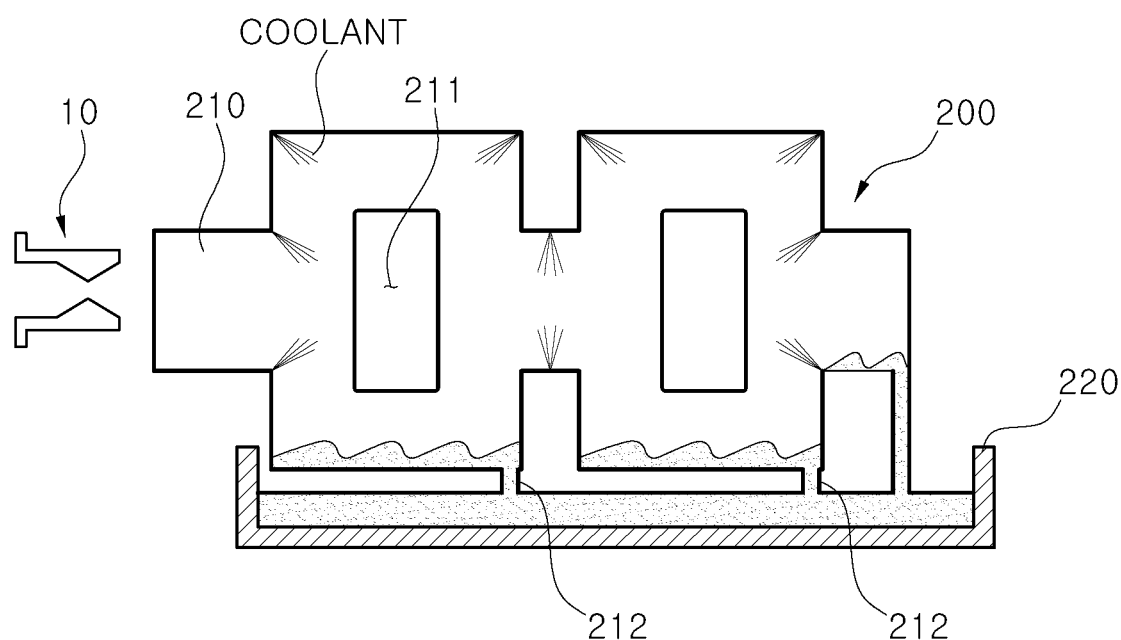
FIG. 1 schematically illustrates a wake treatment system according to the present invention.
Figure 2:
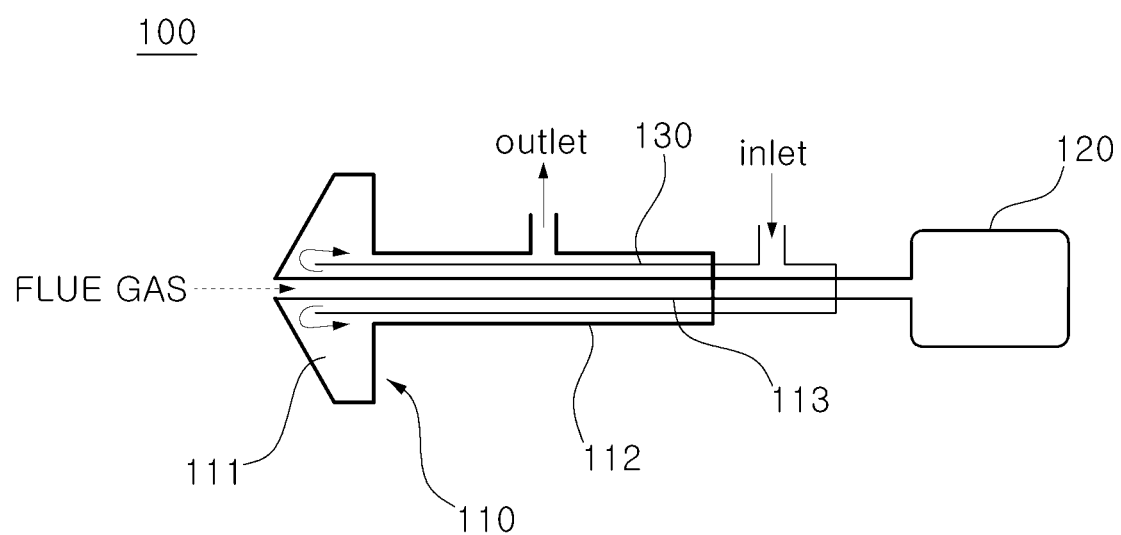
FIG. 2 schematically illustrates a water-cooled flue gas collecting apparatus according to the present invention.
Figure 3:
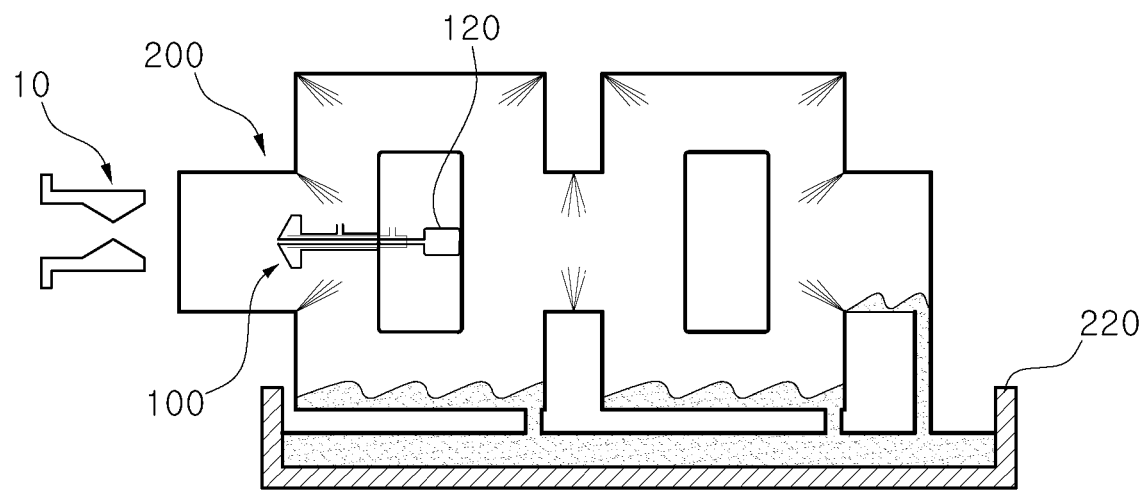
FIG. 3 illustrates a wake treatment system to which a water-cooled flue gas collecting apparatus is applied according to the present invention.

FIG. 1 schematically illustrates a wake treatment system according to the present invention, FIG. 2 schematically illustrates a water-cooled flue gas collecting apparatus according to the present invention, and FIG. 3 illustrates a wake treatment system to which a water-cooled flue gas collecting apparatus is applied according to the present invention.

A water-cooled flue gas collecting apparatus and a wake treatment system including the apparatus according to an embodiment of the present invention will be described below with reference to FIGS. 1 to 3.

The present invention relates to a wake treatment system for treating high-temperature and high-pressure flue gas generated during a ground combustion test of a propulsion system to discharge the treated flue gas into the atmosphere at low temperature and low pressure and a flue gas collecting apparatus applied to the wake treatment system to collect the flue gas for better analysis.

A wake treatment system 200 includes a wake treatment structure 210, a storage tank 220, and a flue gas collecting apparatus 100.

The wake treatment system 200 includes the wake treatment structure 210 for cooling and then discharging the flue gas received from a propulsion system 10 and the storage tank 220 provided below the wake treatment structure 210 for discharging the coolant.

The wake treatment structure 210 receives the flue gas generated from the propulsion system through the flue gas inlet portion formed at one end and discharges the flue gas after treatment through a flue gas outlet portion formed at the other end.

To this end, an internal flow path is formed from the flue gas inlet portion to the flue gas outlet portion in the wake treatment structure 210. The outer circumference of the wake treatment structure 210 may expand and contract repeatedly to form a complicated flow path as illustrated in the drawings, and the flow path may branch out into a plurality of paths at an expansion portion where the outer diameter of the flue gas inlet portion expands.

Further, a hollow dummy space 211 is formed inside the wake treatment structure 210 in order for the flow path to branch out as illustrated in the drawings so that the flow path of the flue gas branches out by the dummy space 211 and the path of the flue gas changes, thus making the flow path complicated.

The flue gas from the propulsion system 100 enters the wake treatment structure 210 through a flue gas inlet portion, follows the flow path formed inside the wake treatment structure 210, and is discharged through a flue gas outlet portion. The high-temperature and high-pressure flue gas passing through the flow path is cooled to be discharged at a low temperature and low speed.

To this end, a plurality of coolant nozzles is provided on the inner wall surface of the wake treatment structure 210, and the coolant is sprayed into the wake treatment structure 210 by the coolant nozzles so that the flue gas may be cooled.

The storage tank 220 is provided below the wake treatment structure 210 to treat the sprayed coolant and is connected to a plurality of coolant outlets 212 formed at the lower end of the wake treatment structure 210 so that the coolant inside the wake treatment structure 210 moves to and is stored in the storage tank 220. A separate coolant discharge device may be provided in the storage tank 220.

Hue gas is dissolved in the discharged coolant and is collected to calculate the combustion efficiency by analyzing particles in the flue gas using various analysis techniques.

However, this configuration alone makes it difficult to measure the amount of dissolved gas and presents challenges for quantitative analyses. Further, there are limitations in using the wake treatment structure, which is a large structure, in various propulsion systems such as rockets.

To resolve the issue, according to the present invention, as shown in FIG. 3, a water-cooled flue gas collecting apparatus is disposed in the flow path formed inside the wake treatment structure 210 to allow separate collection of the flue gas.

Further, the collecting apparatus is disposed in the flow path on the side of the flue gas inlet portion to collect the flue gas for a more accurate analysis. That is, the flue gas that passes through the inside of the wake treatment structure 210 and is not yet transformed into a low-temperature and low-speed state may be collected.

The water-cooled flue gas collecting apparatus 100 includes a gas guiding portion 110, a collecting portion 120, and a cooling tube portion 130.

The gas guiding portion 110 includes an inlet portion 111, a body portion 112, and a gas pipe 113.

A flue gas inlet through which the flue gas enters is formed at one end, i.e., the front end, of the inlet portion 111, and one end of the tubular body portion 112 having an internal space is connected to the other of the inlet portion 111 to form an extension. The body portion 112 is partially open at the other end so that the gas pipe 113 and a cooling tube portion 130, to be described below, pass therethrough.

The inlet portion 111 has a larger outer diameter than the body portion 112 as illustrated in the drawings and has a wedge shape with a smaller outer diameter in the front portion than in the rear portion so that the wedge-shaped plug nozzles may attenuate the damage caused by thermal stress and effectively direct the flue gas to the flow path as desired.

The gas pipe 113 is connected to the flue gas inlet to pass through the other end of the body portion 112 and the collecting portion 120 is connected to the rear end of the gas pipe 113 so that the flue gas entering through the flue gas inlet is collected in the collecting portion 120 through the gas pipe 113.

Further, the diameter of the cooling tube portion 130 is larger than the diameter of the gas pipe 113 and smaller than the diameter of the body portion 112, and the front end of the cooling tube portion 130 is open while the rear end is closed, but the gas pipe 113 passes through the rear end.

A coolant inlet is formed on one side of the cooling tube portion 130 so that the coolant enters therethrough. The entering coolant flows along the outer surface of the gas pipe 113 and the inner surface of the cooling tube portion 130 and flows between the outer surface of the cooling tube portion 130 and the inner surface of the body portion 112 through the open front end.

A coolant outlet is formed on one side of the body portion 112 so that the coolant is discharged through the coolant outlet.

Through such a configuration, the water-cooled flue gas collecting apparatus 100 may cool the flue gas inside the gas pipe 113 and collect the flue gas in the collecting portion 120 in sufficient quantity, allowing for analysis of the flue gas.

Further, the length of the cooling tube portion 130 may be set according to the test targets and environments, and the length of the gas pipe 113 may also be set differently according to the environments such as the size of the propulsion system 10 so that the collecting device may be applied to propulsion systems of various sizes.

Figure 4:
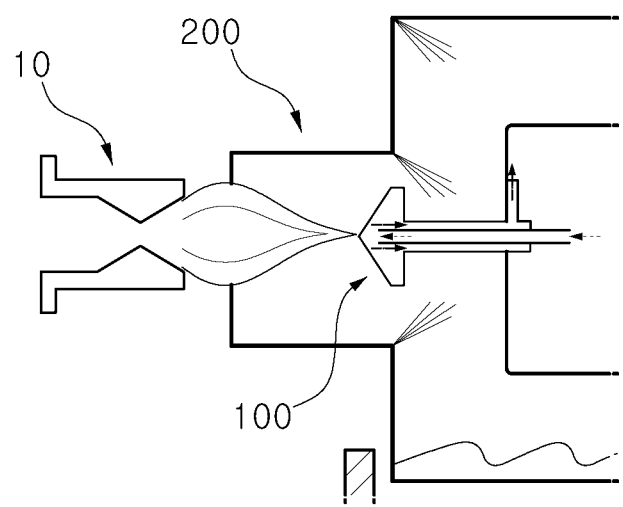
FIGS. 4 and 5 illustrate operating states of the water-cooled flue gas collecting apparatus according to the present invention.
Figure 5:
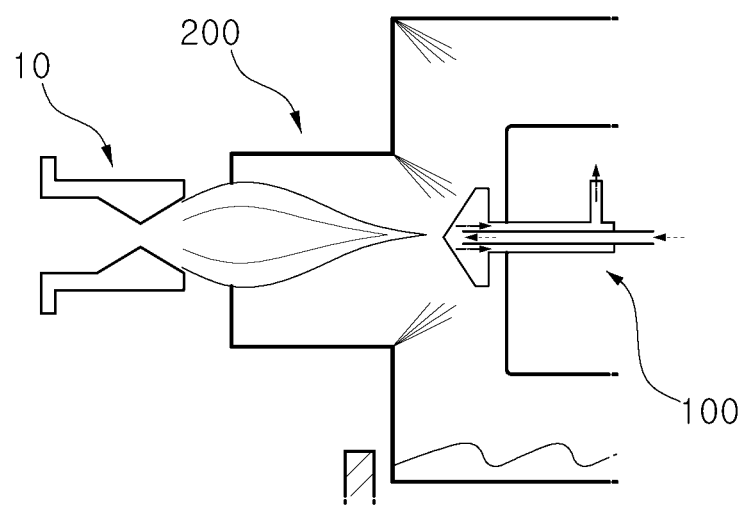

In other words, the water-cooled flue gas collecting apparatus 100 according to the present invention may be configured to move the wake treatment structure 210 so that the distance between the flue gas inlet portion to the gas guiding portion 110 varies in the wake treatment structure 210 as illustrated in FIG. 4 or 5.

That is, a motor or a gear may be provided as a drive device to move the water-cooled flue gas collecting apparatus 100 forward or backward, and may be configured to move forward and backward according to the control of the controller while supported by a support device.

Such a drive device may employ a known technology, and the controller may control the drive device based on the control of an input device and the information from a detection device.

Accordingly, when the length of the flame of the propulsion system 10 is relatively long as illustrated in FIG. 5 compared to the length of the flame of the propulsion system 10 in FIG. 4, the water-cooled flue gas collecting apparatus 100 is made to move backward so that the water-cooled flue gas collecting apparatus 100 is not damaged by the flame surface and the wake treatment system may operate normally.

The water-cooled cooling channel as described above may help relieve fatigue failure caused by the high temperature of the flue gas collecting apparatus and contribute to the improvement of particle collection rates in the flue gas by cooling the collected flue gas. The system may facilitate the quantitative analyses of the flue gas and may be applied to various propulsion systems by modularization of the flue gas wake treatment system.

According to the present invention, the flue gas from rocket propulsion systems of various shapes and sizes may be efficiently collected.

Furthermore, the position of the collecting apparatus may be adjusted such that the collection position of the flue gas may be adjusted. High-temperature flue gas may be cooled by introducing a cooling system and thus be collected more effectively, and damage caused by the thermal stress of the system may be minimized so that tests may be stably repeated.

The present invention is described with reference to the drawings but is not limited to the described embodiments, and it will be self-evident to those skilled in the art that various revisions and modifications may be made without departing from the spirit and scope of the present invention. Accordingly, such revisions and modifications are to belong to the claims of the present invention, and the scope of rights of the present invention is to be interpreted based on the appended claims.

DESCRIPTION OF REFERENCE NUMERALS

100: water-cooled flue gas collecting apparatus
110: gas guiding portion
111: inlet portion
112: body portion
113: gas pipe
120: collecting portion
130: cooling tube portion
200: wake treatment system
210: wake treatment structure
211: dummy space
212: coolant outlet
220: storage tank

What is claimed is:

1. A wake treatment system comprising:
a water-cooled flue gas collecting apparatus;
a wake treatment structure with the water-cooled flue gas collecting apparatus disposed in a flow path formed therein; and
a storage tank provided below the wake treatment structure,
wherein the water-cooled flue gas collecting apparatus comprises:
a gas guiding portion having a flue gas inlet at one end through which a flue gas generated from a test propulsion system enters;
a gas pipe connected to the flue gas inlet at one end to pass through the other end of the gas guiding portion at the other end and form an extension; and
a collecting portion connected to the other end of the gas pipe to collect the flue gas entering through the gas pipe from the flue gas inlet,
wherein the water-cooled flue gas collecting apparatus is disposed in the flow path adjacent to the flue gas inlet,
wherein a placement of the water-cooled flue gas collecting apparatus varies depending on a length of a flame of the test propulsion system,
wherein the size of the outer circumference of a vertical cross-section of the wake treatment structure is not constant,
wherein the outer circumference of the vertical cross-section of the wake treatment structure expands and contracts repeatedly,
wherein the flow path branches out into a plurality of paths at an expansion portion where the outer circumference of the vertical cross-section of the wake treatment structure expands,
wherein a dummy space is formed to change the flow path of the flue gas in the expansion portion inside the wake treatment structure.

2. The wake treatment system of claim 1, wherein the flue gas generated from the test propulsion system enters the wake treatment structure through the flue gas inlet formed at one end of the wake treatment structure and passes through the flow path to be discharged through a flue gas outlet portion formed at the other end of the wake treatment structure.

3. The wake treatment system of claim 2, wherein a plurality of coolant nozzles is provided on an inner wall surface of the wake treatment structure, wherein the coolant is sprayed into the wake treatment structure through the plurality of coolant nozzles.

4. The wake treatment system of claim 3, wherein a plurality of coolant outlets is formed at a lower end of the wake treatment structure, wherein the coolant inside the wake treatment structure is stored in the storage tank through the coolant outlets.

\* \* \* \* \*